Figure 1:
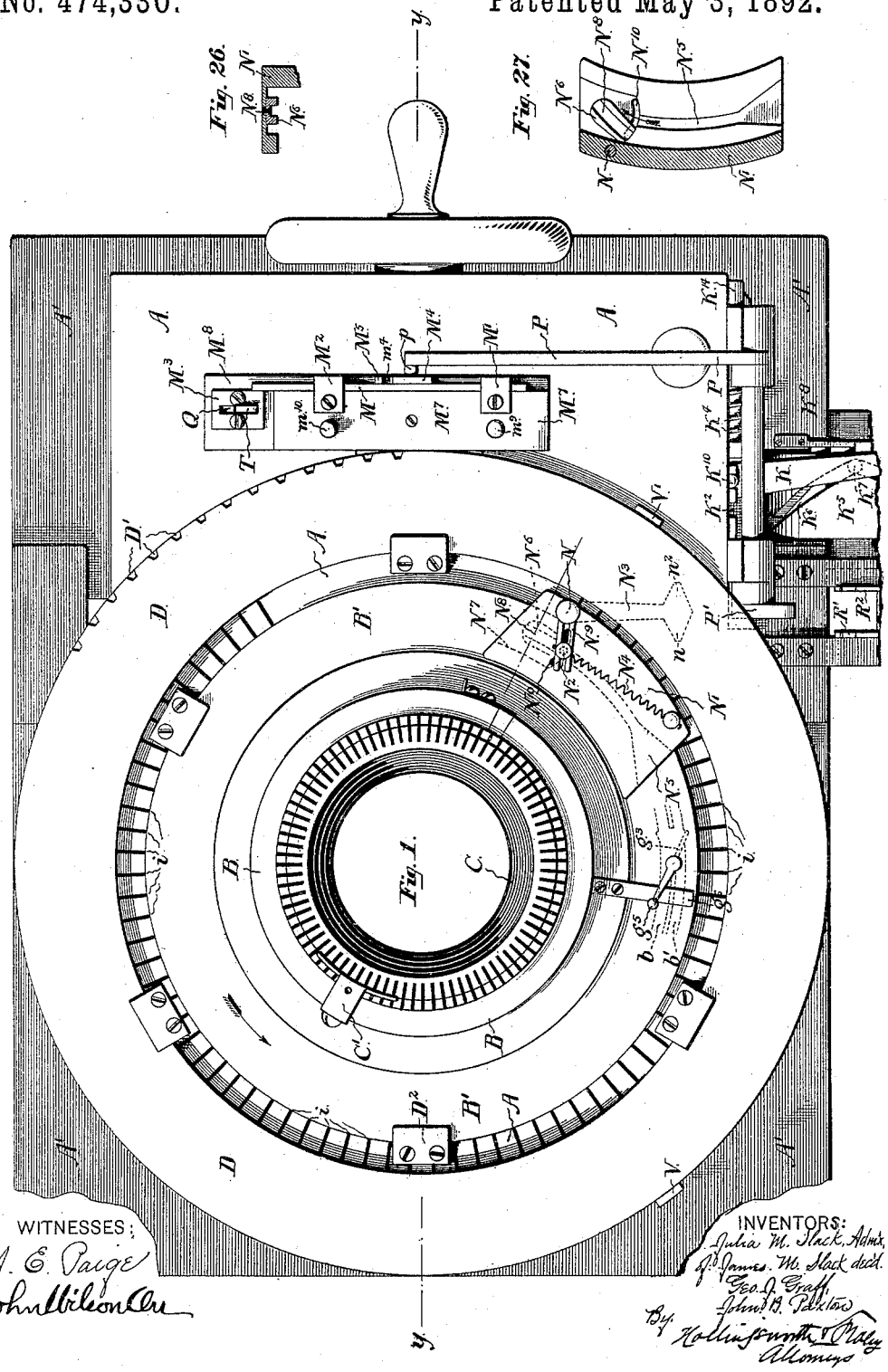

(No Model.) 12 Sheets—Sheet 1.

J. M. SLACK, G. J. GRAFF & J. B. PAXTON.
Julia M. Slack, Administratrix of James M. Slack, Deceased.
CIRCULAR KNITTING MACHINE.

No. 474,330. Patented May 3, 1892.

(No Model.) 12 Sheets—Sheet 2.
J. M. SLACK, G. J. GRAFF & J. B. PAXTON.
Julia M. Slack, Administratrix of James M. Slack, Deceased.
CIRCULAR KNITTING MACHINE.
No. 474,330. Patented May 3, 1892.

WITNESSES:
A. E. Paige
John Wilson Orr

INVENTORS:
Julia M. Slack, Administratrix
of James M. Slack, decd.
Geo. J. Graff
John B. Paxton.
By Hollingsworth & Haley
Attorneys (No Model.) 12 Sheets—Sheet 3.
J. M. SLACK, G. J. GRAFF & J. B. PAXTON.
JULIA M. SLACK, Administratrix of JAMES M. SLACK, Deceased.
CIRCULAR KNITTING MACHINE.
No. 474,330. Patented May 3, 1892.

WITNESSES:
A. E. Paige
John Wilson Orr

INVENTORS:
Julia M. Slack, Administratrix of James M. Slack, decd.
Geo. J. Graff
John B. Paxton.
By Hollingsworth & Haley
Attorneys (No Model.) 12 Sheets—Sheet 4.
J. M. SLACK, G. J. GRAFF & J. B. PAXTON.
JULIA M. SLACK, Administratrix of JAMES M. SLACK, Deceased.
CIRCULAR KNITTING MACHINE.
No. 474,330. Patented May 3, 1892.
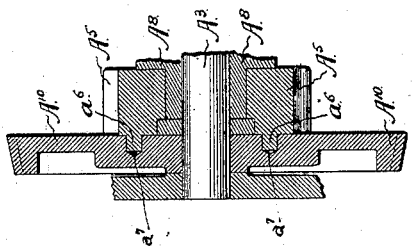
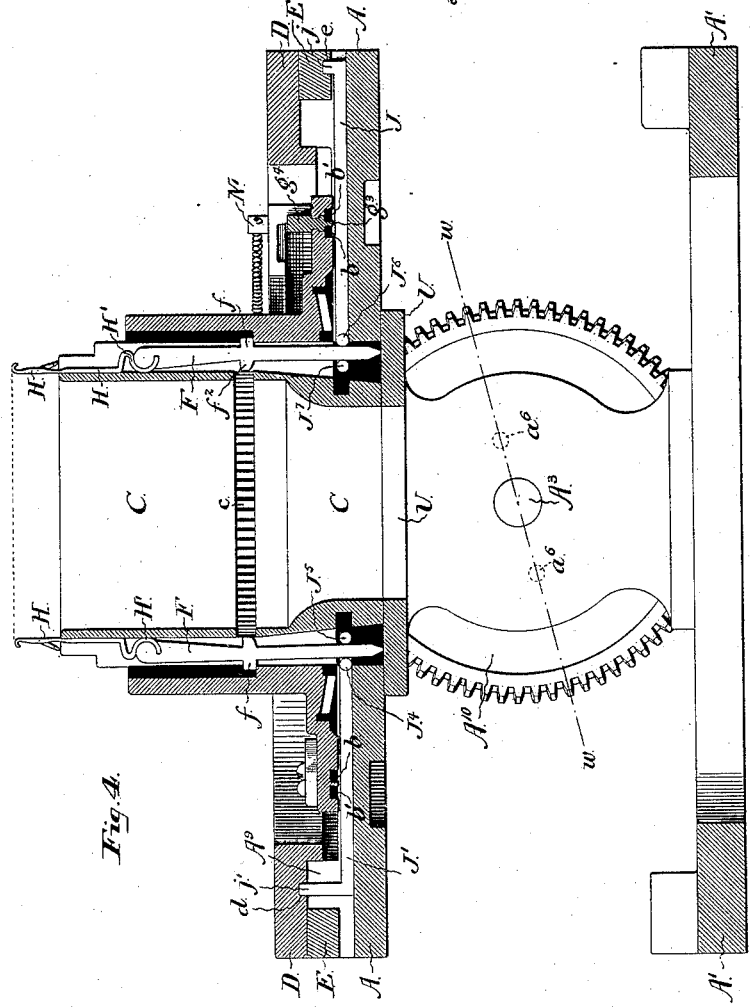
WITNESSES:
INVENTORS:

(No Model.) 12 Sheets—Sheet 5.
J. M. SLACK, G. J. GRAFF & J. B. PAXTON.
JULIA M. SLACK, Administratrix of JAMES M. SLACK, Deceased.
CIRCULAR KNITTING MACHINE.
No. 474,330. Patented May 3, 1892.
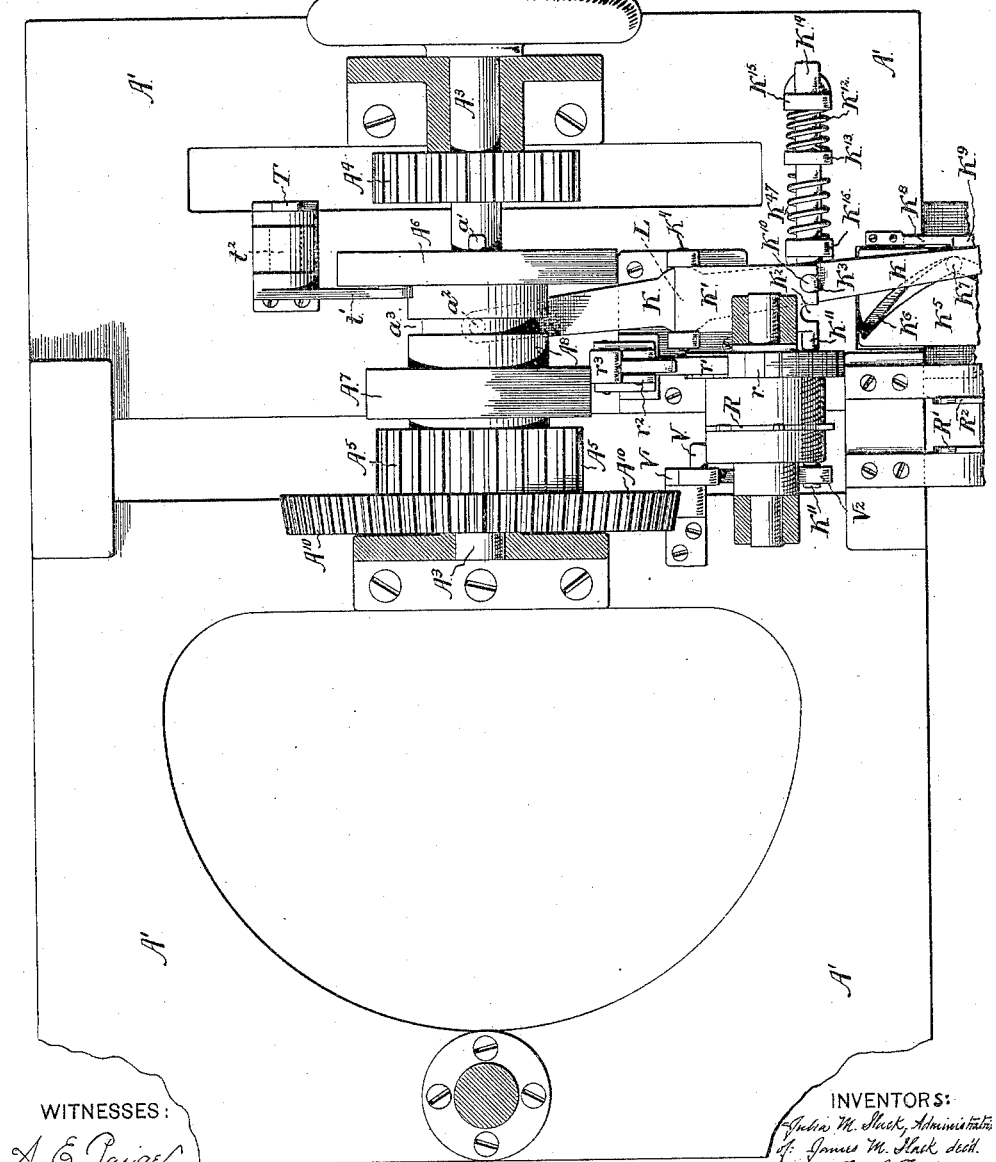

(No Model.) 12 Sheets—Sheet 6.

J. M. SLACK, G. J. GRAFF & J. B. PAXTON.
Julia M. Slack, Administratrix of James M. Slack, Deceased.
CIRCULAR KNITTING MACHINE.

No. 474,330. Patented May 3, 1892.

(No Model.) 12 Sheets—Sheet 7.
J. M. SLACK, G. J. GRAFF & J. B. PAXTON.
JULIA M. SLACK, Administratrix of JAMES M. SLACK, Deceased.
CIRCULAR KNITTING MACHINE.
No. 474,330. Patented May 3, 1892.
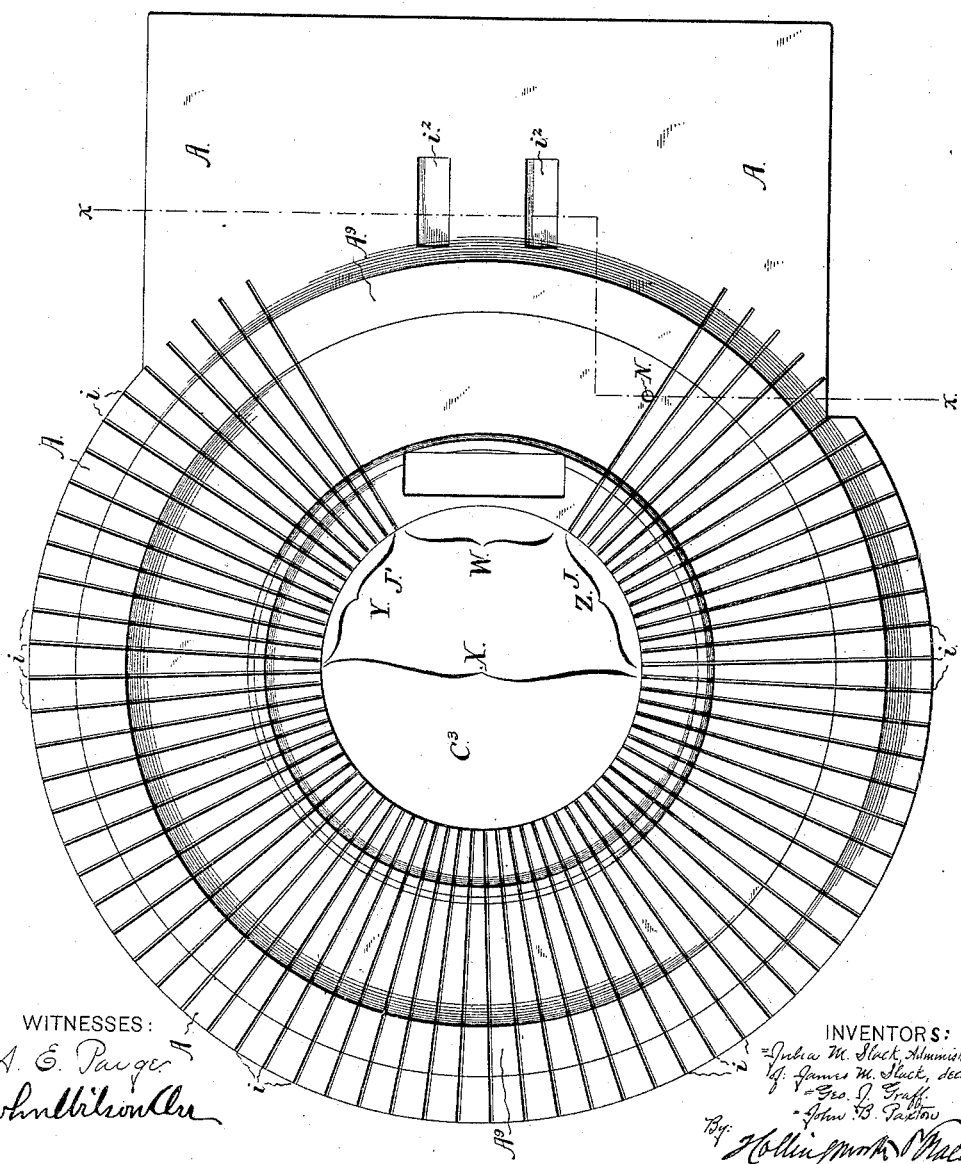

(No Model.) 12 Sheets—Sheet 8.
J. M. SLACK, G. J. GRAFF & J. B. PAXTON.
JULIA M. SLACK, Administratrix of JAMES M. SLACK, Deceased.
CIRCULAR KNITTING MACHINE.
No. 474,330. Patented May 3, 1892.
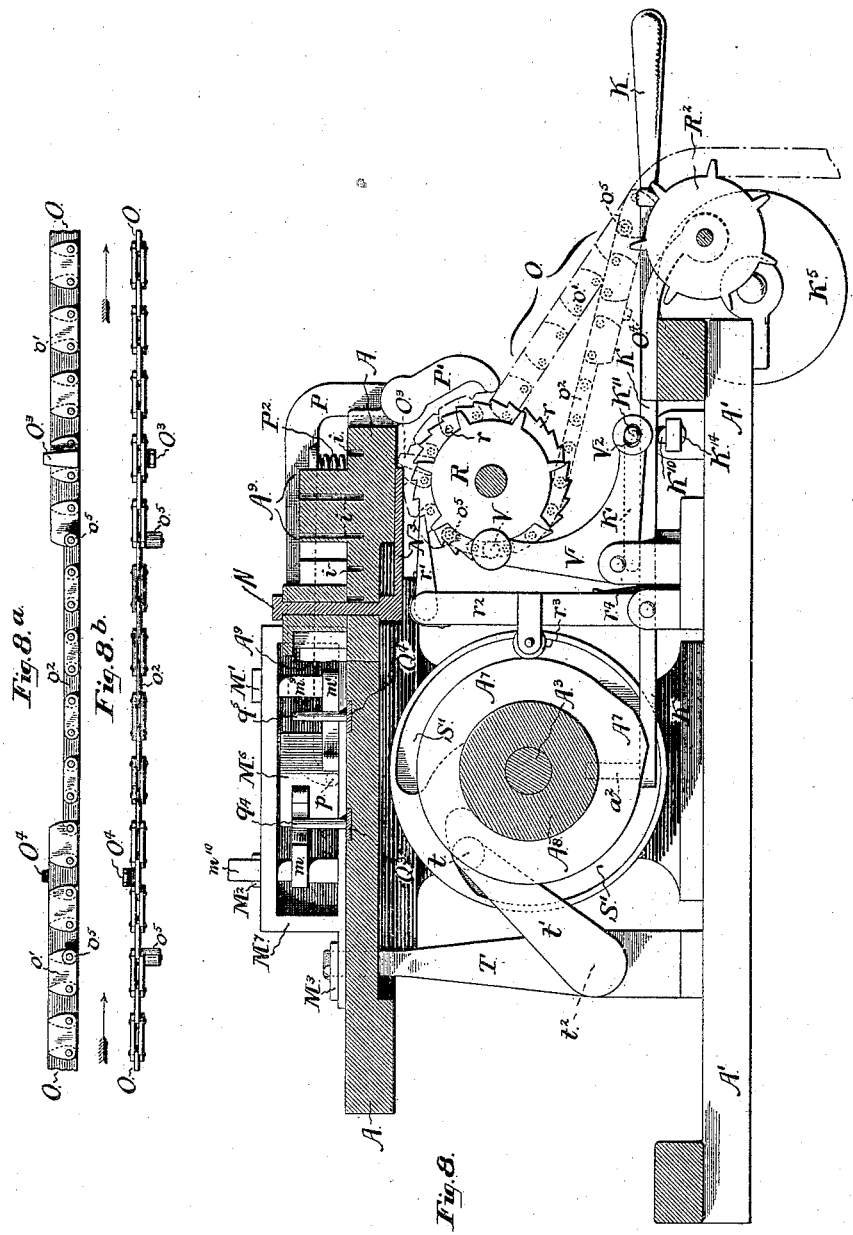

(No Model.) 12 Sheets—Sheet 9.
J. M. SLACK, G. J. GRAFF & J. B. PAXTON.
Julia M. Slack, Administratrix of James M. Slack, Deceased.
CIRCULAR KNITTING MACHINE.
No. 474,330. Patented May 3, 1892.
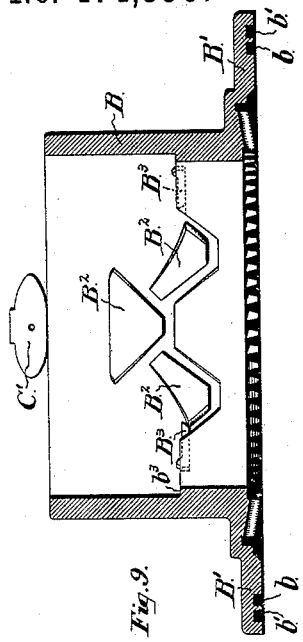
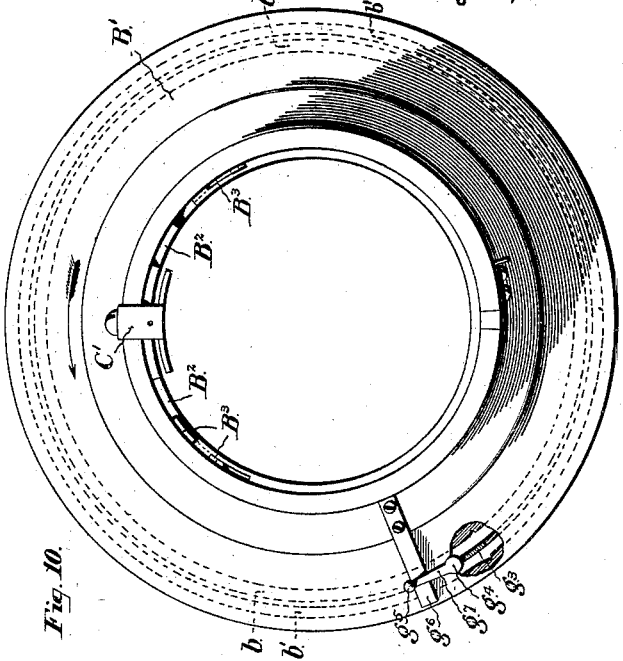
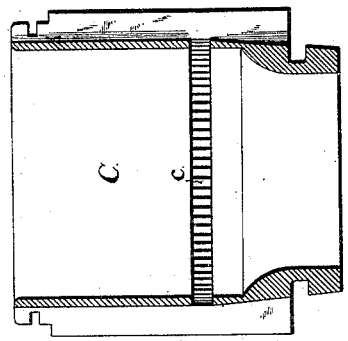
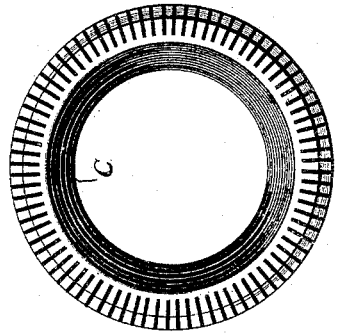
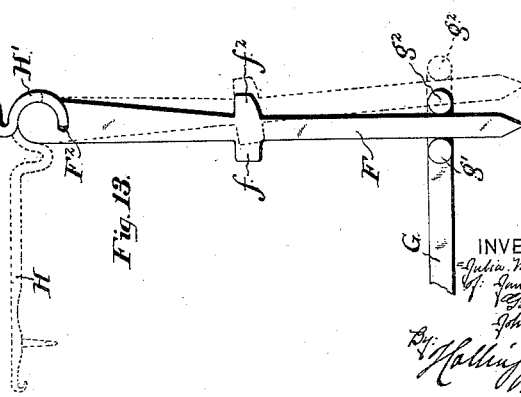

(No Model.) 12 Sheets—Sheet 10.
J. M. SLACK, G. J. GRAFF & J. B. PAXTON.
JULIA M. SLACK, Administratrix of JAMES M. SLACK, Deceased.
CIRCULAR KNITTING MACHINE.
No. 474,330. Patented May 3, 1892.
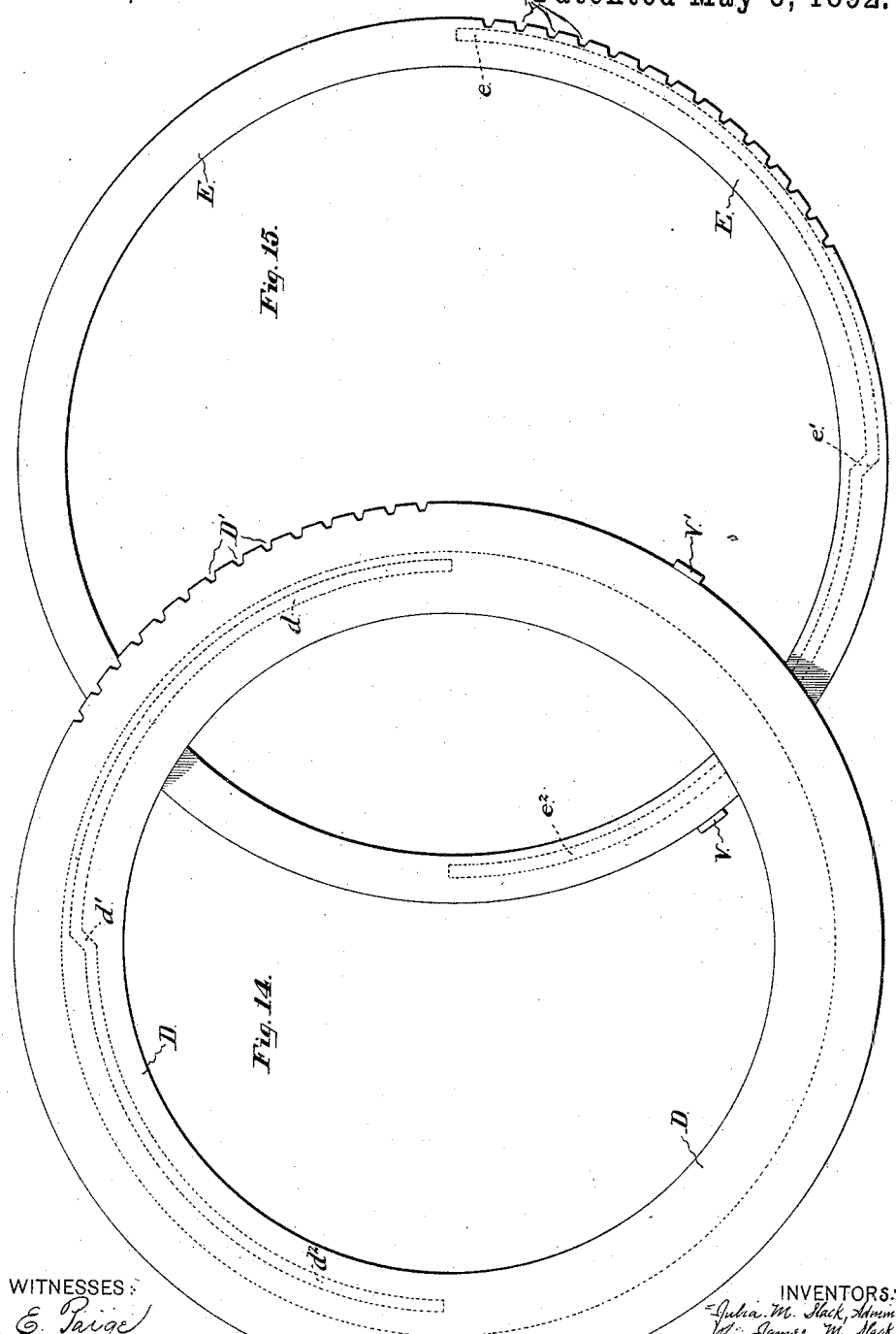

(No Model.) 12 Sheets—Sheet 11.
J. M. SLACK, G. J. GRAFF & J. B. PAXTON.
JULIA M. SLACK, Administratrix of JAMES M. SLACK, Deceased.
CIRCULAR KNITTING MACHINE.
No. 474,330. Patented May 3, 1892.
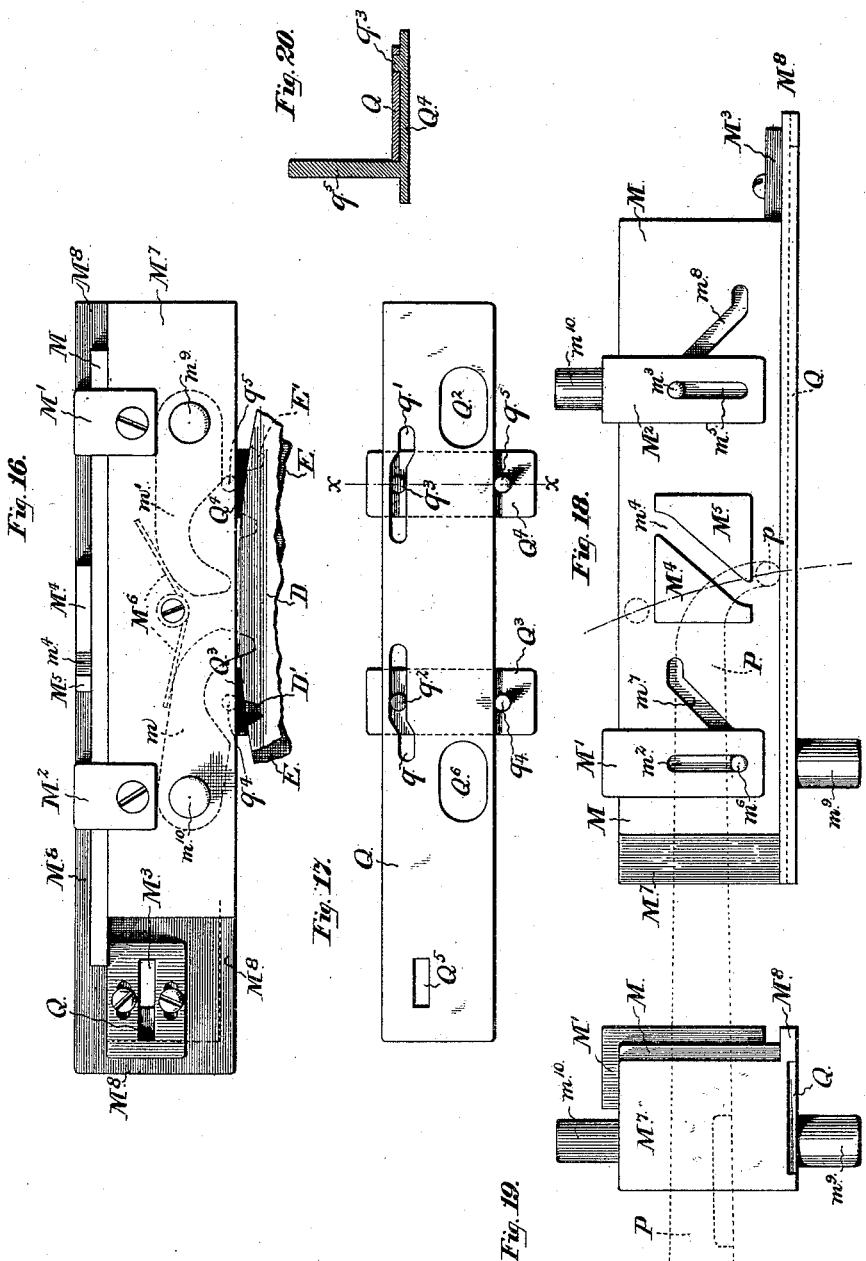

(No Model.)  12 Sheets—Sheet 12.

J. M. SLACK, G. J. GRAFF & J. B. PAXTON.
Julia M. Slack, Administratrix of James M. Slack, Deceased.
CIRCULAR KNITTING MACHINE.

No. 474,330.  Patented May 3, 1892.

WITNESSES:
A. E. Paige
John Wilson Orr

INVENTORS:
Julia M. Slack, Administratrix
of James M. Slack, dec'd.
Geo. J. Graff
John B. Paxton
By Hollingsworth & Baley
Attorneys

UNITED STATES PATENT OFFICE.

JULIA M. SLACK, OF BRISTOL, ADMINISTRATRIX OF JAMES M. SLACK, DECEASED, AND GEORGE J. GRAFF AND JOHN B. PAXTON, OF PHILADELPHIA, PENNSYLVANIA; SAID PAXTON ASSIGNOR TO SAID JULIA M. SLACK, ADMINISTRATRIX, AND GEORGE J. GRAFF.

CIRCULAR-KNITTING MACHINE.

SPECIFICATION forming part of Letters Patent No. 474,330, dated May 3, 1892.

Application filed August 9, 1888. Serial No. 282,354. (No model.)

*To all whom it may concern:*

Be it known that JAMES M. SLACK, deceased, formerly of Bristol, Bucks county, Pennsylvania, (whose administratrix is JULIA M. SLACK, of Bristol aforesaid,) and GEORGE J. GRAFF and JOHN B. PAXTON, both of Philadelphia, Pennsylvania, did jointly invent certain new and useful Improvements in Circular-Knitting Machines, whereof the following is a specification, reference being had to the accompanying drawings.

The improvements relate to circular or cylinder knitting-machines as the same are applied to the manufacture of hosiery; and the primary object of the invention is to facilitate the narrowing and widening operations incident to the making of a stocking.

The primary feature of novelty of the machine lies in the mode of throwing the needles into and out of the range of the knitting-cams, which is effected by a system of jacks detachably connected to the individual needles, said jacks being positively operated by shifters, which derive their movement from a secondary cam system carried by two concentric rings surrounding the main or primary cam-cylinder.

A secondary feature consists in the method by which the various movements of the different groups of mechanism are derived from an endless pattern-chain.

Other and subsidiary features of improvement will be adverted to in the following description.

Figure 2:
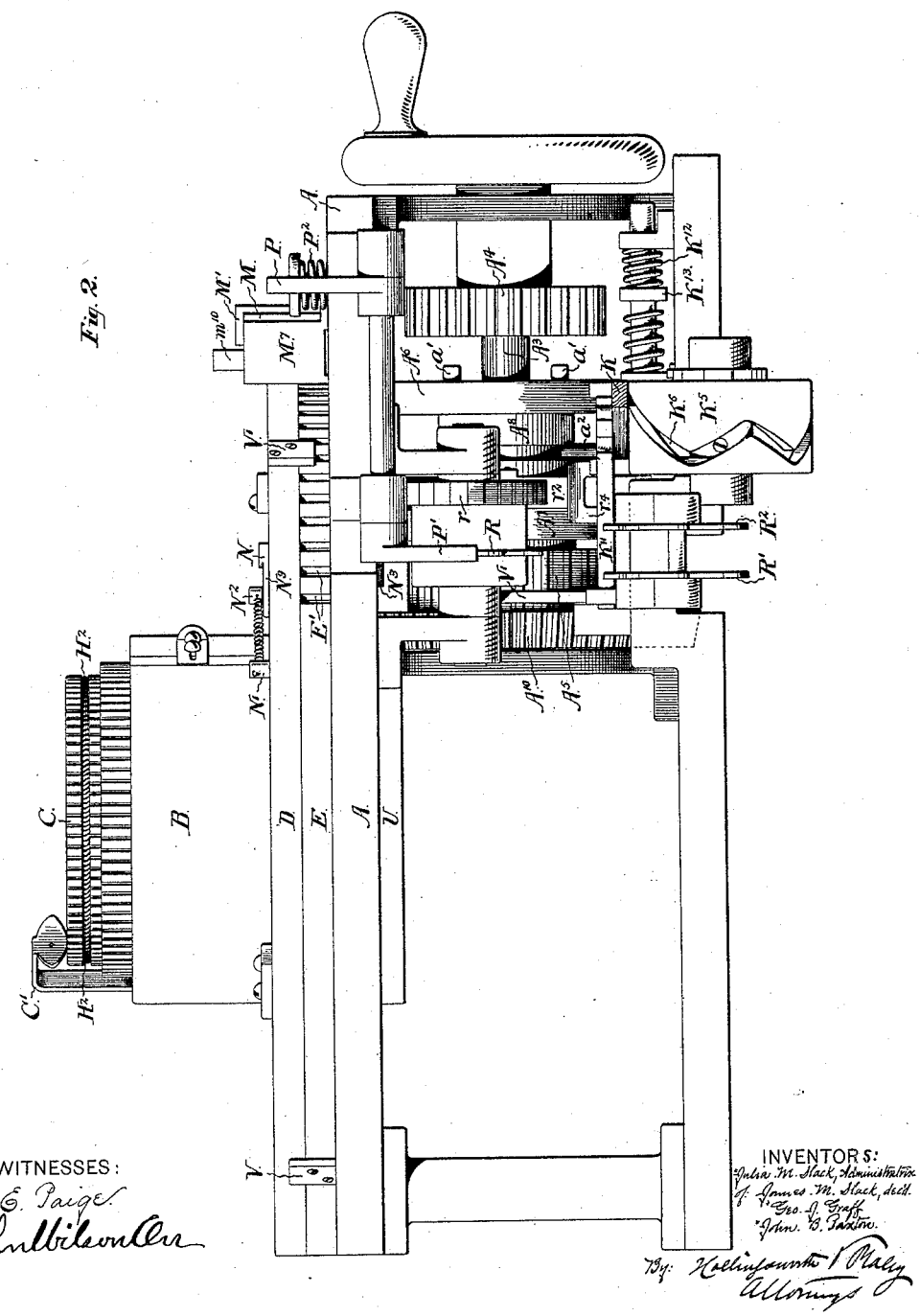
Figure 3:
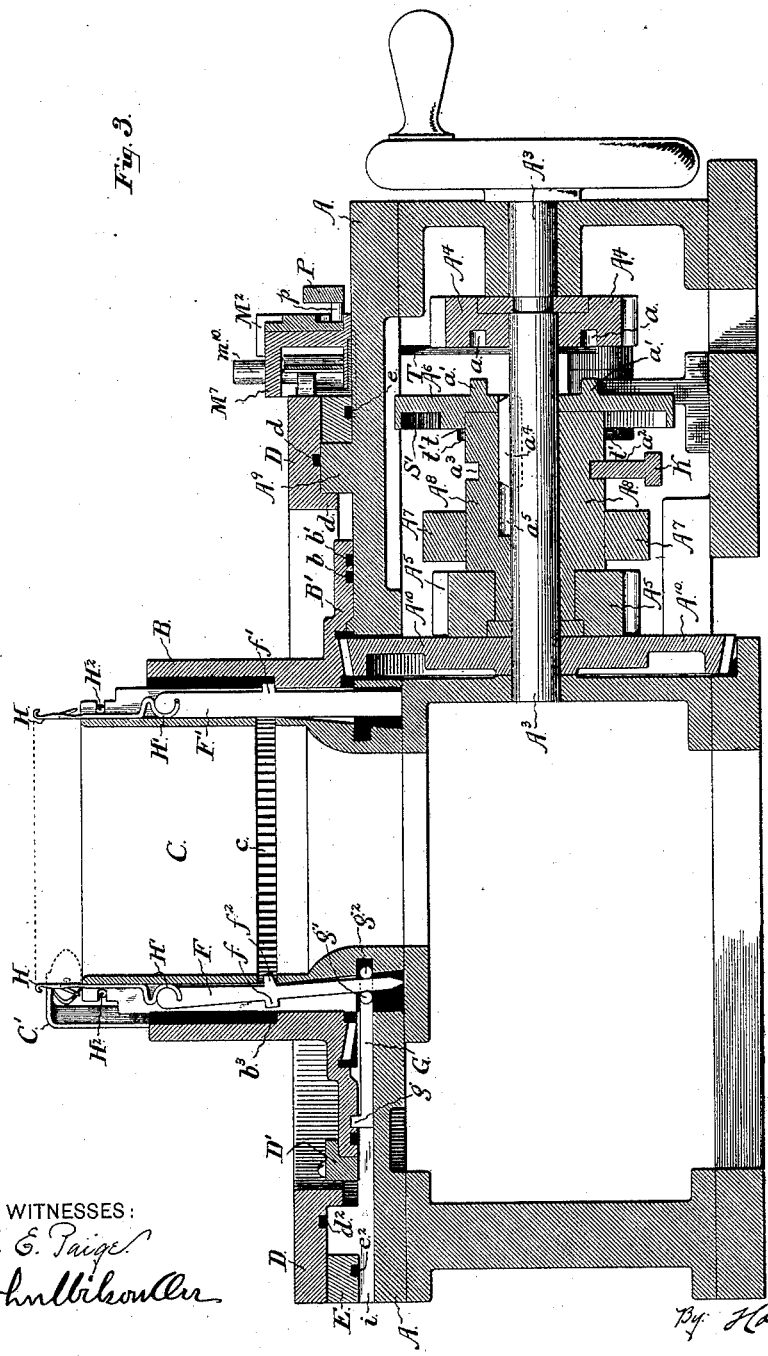
Figure 6:
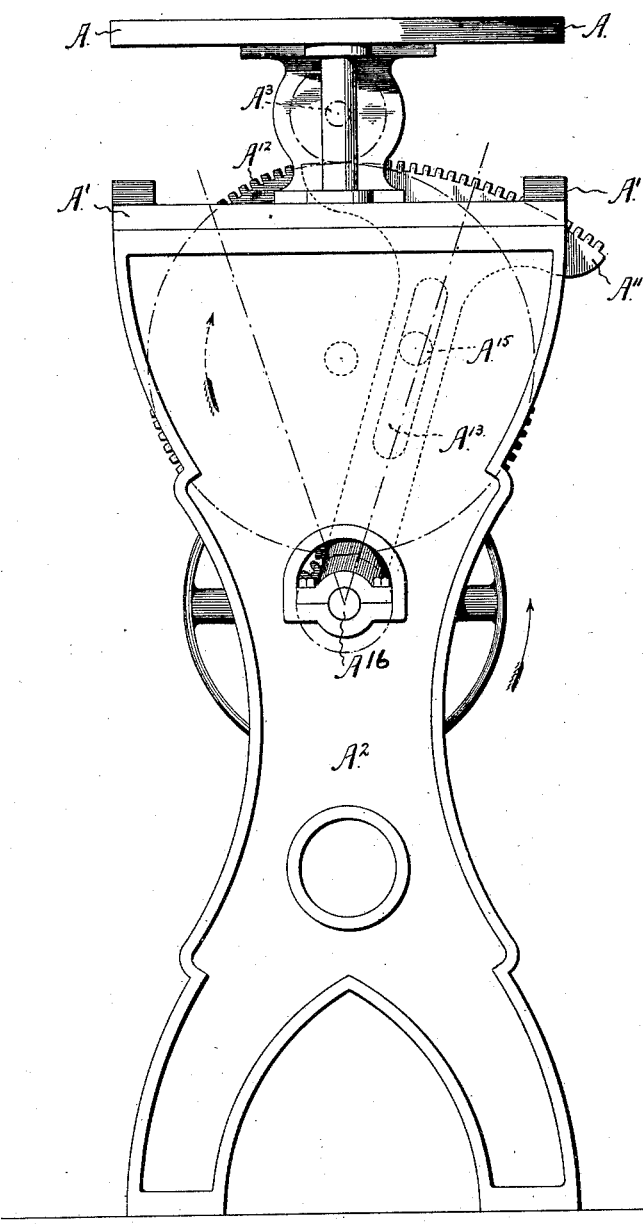
Figure 23:
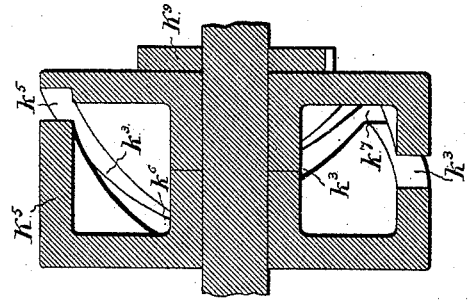
Figure 21:
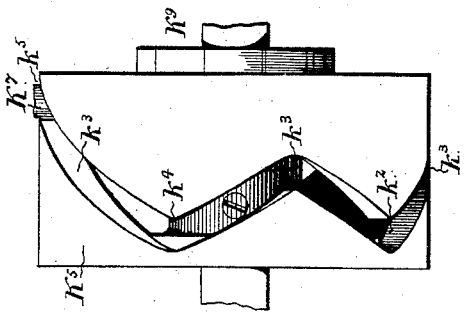
Figure 22:
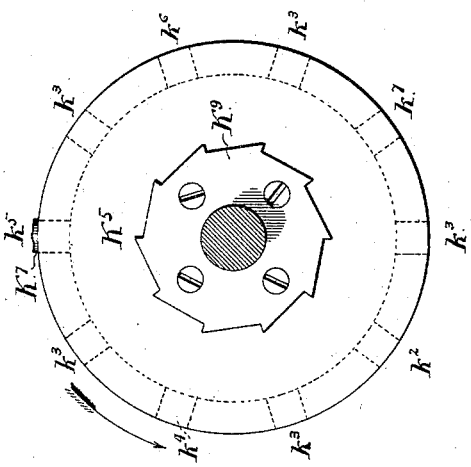
Figure 24:
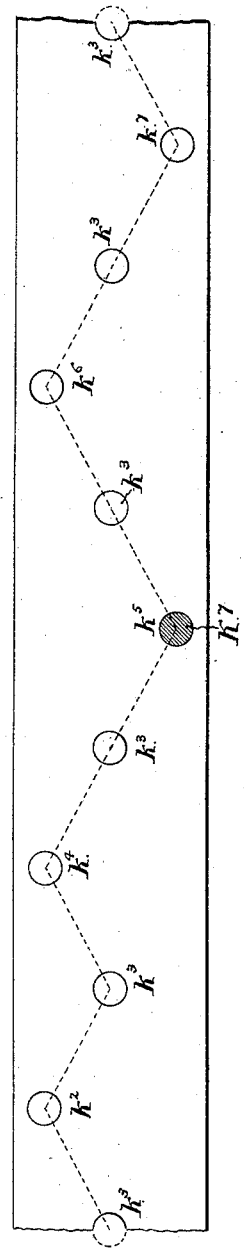

In the accompanying drawings, Figure 1 represents a partial top or plan view of the machine; Fig. 2, a side view thereof; Fig. 3, a vertical section thereof on a plane running through the center of the needle-cylinder on the line *y y* of Fig. 1. Fig. 4 is a partial section through the needle-cylinder and adjacent parts on a plane at right angles to that of Fig. 3. Fig. 5 is a top view of the driving and clutch mechanism with the upper parts of the machine removed. Fig. 6 is a partial end view of the machine as seen from the left-hand side of Fig. 1. Fig. 7 is a plan view of the plate on which the cam-cylinder rests. Fig. 8 is a sectional view of the upper portion of the machine on two different planes indicated by the line *x x* of Fig. 7. Figs. 8$^a$ and 8$^b$ are respectively a side elevation and a top view of a portion of the endless chain by which the sequence of the various movements is determined. Figs. 9 and 10 are respectively a central vertical section and a top view of the cam-cylinder. Figs. 11 and 12 are respectively a vertical section and a top view of the needle-cylinder. Fig. 13 is a detail view showing different positions of a needle and the parts connected therewith. Figs. 14 and 15 are top views of the two rings which actuate certain mechanism controlling the needles, one of said views being for economy of space superimposed upon a portion of the other. Figs. 16, 17, 18, 19, and 20 are detail views of the mechanism which actuates the two rings shown in Figs. 14 and 15. Figs. 21, 22, and 23 are respectively a side elevation, an end view, and a central section of the rotating cam-cylinder which controls the shifting-lever of the clutch mechanism for the driving-shaft, and Fig. 24 is a diagram illustrating different positions of the parts in the successive movements of said shifting-lever. Fig. 25 is a partial section through the axis of the clutch-coupling, the plane of section being indicated by the line *w w* in Fig. 4. Figs. 26 and 27 are detail views of the shifter which controls the switch for certain of the jacks, Fig. 26 being a cross-section thereof and Fig. 27 a view of the under side thereof.

Broadly speaking, the knitting operation of this machine is similar to that found in others of its class, and the narrowing and widening of the fabric to form a heel of the stocking are effected by the change of the continuous rotary movements of the cylinder into an oscillating one, accompanied by the throwing out of and subsequently into play of successive needles in that arc of the needle-cylinder which is operative during the period of oscillating movement.

Before, therefore, describing the features of construction peculiar to the invention we state generally that in the drawings A represents a base-plate, on which is directly supported the cam-cylinder B, carrying the thread-guide C' and surrounding the needle-cylinder C, which rests upon a subjacent ring U. The needles are represented by H and the knitting-cams by $B^2$. The cam-cylinder is actuated by means of the usual bevel-gear $A^{10}$, mounted upon a shaft $A^3$, which receives (through mechanism to be presently described) a continuous rotary motion from a gear $A^{12}$, or an oscillating motion from a segment $A^{11}$. (See Fig. 6.) Said gear and segment are actuated from the main driving-shaft $A^{16}$, mounted in the housings $A^2$, the segment being oscillated by means of a pin $A^{15}$, mounted upon the proximate face of the gear $A^{12}$ and running in a slot $A^{13}$, formed longitudinally in the radius-arm of the segment.

The coupling mechanism by which either the gear $A^{12}$ or the segment $A^{11}$ is made to drive the shaft $A^3$ is shown most clearly in Fig. 3. The gear $A^4$ runs free upon said shaft, and the gear $A^5$ is freely mounted upon one end of a coupling or sleeve $A^8$, which slides longitudinally upon said shaft and which has a slot $a^5$ to receive a feather $a^4$, attached to the shaft $A^3$. The gear $A^4$ has upon its face holes $a$, adapted to engage with the studs $a'$, mounted upon the proximate end of the sliding sleeve $A^8$. The parts just mentioned also carry other elements which have no direct relation to the coupling mechanism and the description of which is therefore postponed.

The action of the gear $A^{12}$ upon the gear $A^4$ is constant; but it is only when said gear $A^4$ is in engagement with the sleeve $A^8$ that such motion is imparted to the shaft $A^3$. The gear $A^5$ is in constant engagement with the segment $A^{11}$ and has on that face which is toward the bevel-gear $A^{10}$ pins $a^6$, (see Figs. 4 and 25,) which engage in holes $a^7$, formed in the gear $A^{10}$, being of course free during the time when the gear $A^4$ is coupled, and vice versa. The bevel-gear $A^{10}$ is of course rigidly mounted upon the shaft $A^3$. The shifting of the coupling-sleeve $A^8$ is effected by means of a pin $a^2$, mounted upon a lever K, whose motion is controlled in a peculiar manner, which will be described hereinafter.

We will now describe the jacks which are connected with the needles. It will be seen that the needles H have short thin shanks terminating in a semicircular bend H', near the level of the cam-cylinder top. The jacks F lie in the slots of the needle-cylinder below the needles, of which in effect they are practically continuations, being detachably connected therewith by means of the bends H', which fit into correspondingly-shaped slots $F^2$ near the upper end of the jack. Each jack has an outward projection or stud $f$, which is operated upon by the knitting-cams in the same manner as the ordinary "heel" of a needle. The jacks of those needles which are employed in the narrowing and widening operation are each provided with a second stud $f^2$, and the needle-cylinder C has a slot $c$ extending all the way around its interior and communicating with the bottoms of the needle-grooves on a plane opposite to the studs $f^2$.

Referring to the detail view, Fig. 13, it will be seen that when the needles and their jacks are in place in the needle-cylinder the jacks may be swung upon the bends of the needles in a radial direction to the needle-cylinder, as indicated by the dotted lines in the lower portion of said figure, since the slot $c$ permits the studs $f^2$ of the jacks upon the narrowing and widening needles to enter when swung inwardly. When the jacks of said needles are in their extreme outward position relatively to the cylinder, the studs $f$ are in a position to engage with the knitting-cams; but when the jacks are swung inwardly said studs are withdrawn from the range of the knitting-cams, as indicated clearly on the left-hand side of Fig. 3; but the studs $f^2$, entering the slot $c$, rest upon the lower edge of said slot, and thus hold the jacks and needles against accidental vertical displacement. We prefer to make the needle-shanks short, as described, so as to facilitate the insertion and removal of the needles, which are accomplished, as indicated by the dotted lines at the top of Fig. 13, by rotating the needle bends radially in the curved slot at the top of the jacks. The points of attachment being nearly on a level with the top of the cam-cylinder, it will be seen that this operation is readily permitted.

Although there is a small segment of the needle-cylinder in which there is no occasion to throw the needles into and out of engagement with the knitting-cams, we prefer for the sake of uniformity to mount the needles throughout this segment upon the jacks F', (see right-hand side of Fig. 3,) which jacks have the outside stud $f'$ to engage with the knitting-cams; but not needing to be capable of the swinging movement the inside lugs corresponding to $f^2$ may be omitted and the jacks may be of such width as to be incapable of radial movement relative to the needle-cylinder.

It will be seen that by shifting the lower ends of the jacks F inward or outward the desired modification of the number of operative needles can be produced, and we will therefore, without further dwelling upon the general operation of "narrowing and widening," which is well understood, proceed to describe the groups of mechanism which effect this shifting of the jacks.

In Fig. 7 is shown a plan view of the plate on which the cam-cylinder rests, and it will be there seen that said plate contains a number of vertical slots $i$, arranged radially around the opening $C^3$, through which the needle-cylinder extends downwardly. Throughout a segment W said slots are omitted, and this segment corresponds to the position of those needles which are permanently in an operative position and which, as before stated, are provided with what may be called "dummy-jacks." The slots $i$ in the plate A are intended to receive and to act as guides for the jack-shifters, which are metal strips of different lengths and configuration, as will presently be described, but all of which are adapted to engage with the lower ends of the jacks by devices such as are shown in Fig. 13, where G represents a jack-shifter having near its end two round projections $g'$ $g^2$, between which the tail of the jack extends downwardly, so as to be embraced thereby. The jack-shifters may be divided into three groups, each extending throughout a definite segment of the plate A. The short jack-shifters G (shown in Fig. 3) are found throughout a semicircle of the grooves $i$, whose inner ends are embraced by the bracket X. (See Fig. 7.) The long jack-shifters J and J' (see Fig. 4) are found, respectively, in the segments embraced by the brackets Z and Y, each being somewhat less than a quadrant. The jack-shifters J are somewhat longer than the jack-shifters J', and all of them (as well as the shifters G) are provided at their outer ends with projections or uprights $j, j'$, and $g$, respectively. The shifters move freely in a direction radial to the needle-cylinder, and, according as they are thrust inward or drawn outward, they throw the jacks out of or into play. This movement is effected in the following manner: The cam-cylinder B has a horizontal annular flange B' of considerable width extending around its base outside of the bevel-gearing. This flange has on its under side two concentric grooves $b$ $b'$, separated by a thin web of metal. These grooves are of such depth that when the flange B' rests upon the plate A the uprights $g$ of the jack-shifters G can fit snugly within them. At a certain point in the circumference the web which separates the grooves is cut away for a short distance, and the opening is filled by a gate $g^3$, turning upon a vertical pivot $g^4$, which extends up through the flange and is attached at its upper end to a handle $g^7$, provided with a stud $g^5$, and also with a flat spring of metal $g^6$, which bears up against the under side of said handle, so as to prevent accidental displacement. When this gate $g^3$ is in its central position, it forms a continuation of the web of metal which separates the grooves; but when it is turned to one side or the other it acts as a switch and diverts the uprights $g$ (upon the ends of the jack-shifters G) from the groove in which they are then traveling into the other groove. The endwise movement thus given to the jack-shifters is sufficient to throw the jacks into or out of play, as the case may be, and the turning of the gate $g^3$, which determines it, is effected by the device shown in Figs. 1, 26, and 27. A flat segmental piece N' is secured to the base-plate outside of the edge of the flange B', but so as to overhang the latter. Upon the under side of this piece N' is formed an arc-shaped slot or groove $N^5$, having the configuration indicated in the dotted lines in Fig. 1—that is to say, the forward end, or that toward which the cam-cylinder normally rotates, is converging or funnel shaped, and its rear end has a lateral enlargement $N^7$, the height of the slot being sufficient for the stud $g^5$ to pass freely under. Near the rear end of this slot $N^5$ is a gate-piece $N^6$, having through its center a longitudinal slot of the same size as the adjacent narrow portion of the slot $N^5$. This gate is pivoted at $N^8$, the end of the pivot being flush with the top of the slot through the gate-piece. A stud or pin $N^2$ is attached to the front end and projects out through a curved slot $N^{10}$ in the top of the piece N'. Said pin is embraced by two arms $N^9$, attached to an upright rock-shaft N, which extends down through the plate A and which carries at its lower end a lever $N^3$, having lateral projections $n$ $n^2$, adapted to be operated upon by studs or projections $O^3$ $O^4$, arranged at the proper intervals along the sides of an endless chain O. This chain is actuated by mechanism which will be described hereinafter; but according to the action of its studs upon the projections $n$ or $n^2$ they shift the lever $N^3$ to one side or the other, turning the shaft N. This movement causes the fingers $N^9$ to throw the pin $N^2$ in one direction or the other and turns the gate $N^6$ in correspondence with such motion. A spring $N^4$, suitably attached to the piece N' and to the pin $N^2$, tends to retain the latter in what may be called its "neutral" position— that is to say, with its slot forming a continuation of the slot $N^5$. The slot $N^5$ is immediately over the web of metal which separates the slots $b$ $b'$ in the flange B' beneath. When, therefore, the cam-cylinder and its flange B', rotating in the direction of the arrow, Fig. 1, bring the stud $g^5$ into the front end of the slot $N^5$, said stud, whatever its position may have heretofore been, will be shifted to a central position by means of the funnel-shaped opening. If the gate $N^6$ be in its neutral position, the said stud will pass through the slot $N^5$ and the continuation thereof in the gate $N^6$, emerging at the rear end in such a position as to keep the gate $g^3$ central, and thus maintain the separation between the slots $b$ $b'$. If, however, the gate $N^6$ be shifted in one direction or the other, the stud $g^5$ will strike against the inclined side of said gate and be diverted from the path in which it has been rotating. According as said diversion is to the one side or to the other, the movement of the stud will turn the switch $g^3$ correspondingly. Obviously these movements may be varied by the arrangement of studs upon the chain O, and thus an automatic control of the switch $g^3$, which in turn controls the jack-shifters G, and the group of needles corresponding thereto is established. As before stated, this group of needles extends through a semicircle and is the group whose members are all thrown out of play together at the commencement of the narrowing operation and thrown back together into play at the close of the widening operation. The remaining jack-shifters J and J' are to be shifted one at a time, so as to throw into or out of play a single needle at each end of the then operating group at the close of each oscillation of the cylinder. This is effected in the following manner: A ring E rests upon the plate A, and has on its under side a groove (see Fig. 15) extending through a semicircle, one quadrant $e$ of which is of greater radius than the other quadrant $e^2$, said quadrant being connected by a sharply-inclined groove $e'$. Above the ring E is a second and wider ring D, which overhangs on the inner side. This ring D is also provided with a similarly-arranged semicircular groove consisting of a quadrant $d^2$ and a quadrant $d$ of longer radius, the two being connected by a sharply-inclined groove $d'$. Suitable guides are of course provided to maintain the rings D and E in proper position, and each of said rings has upon its outer periphery ratchet-teeth D' E', respectively.

Referring now to the sectional view in Fig. 4, it will be seen that the uprights $j'$ of the jack-shifters J' fit into the groove $d$ of the ring D and the shorter uprights $j$ of the longest jacks J fit into the groove $e$ of the ring E. Actuating devices (hereinafter to be described) rotate the rings D and E at the proper time and to the extent of one tooth at a time. This range of movement corresponds to the length of the inclines $d'$ $e'$, which are in effect cams and which when brought to bear against the uprights $j'$ and $j$ throw the jack-shifters J' and J, respectively, a distance sufficient to effect the shifting of the lower end of their respective jacks. Thus, assuming that there exists a proper timing of the actuating devices for the entire system of jack-shifters, it will be seen that during a period corresponding with the knitting of the stocking-leg the rings D and E are stationary, the flange B' is rotating continuously with the cam-cylinder B, and since the switch-gate $g^3$ is in its neutral or closed position all the jack-shifters are idle. As soon, however, as the reciprocating rotary motion of the cam-cylinder is about to begin, the switch $g^3$ is shifted, and during a half-rotation of the cylinder all the jack-shifters G are thrown inward, thus withdrawing their jacks from the range of the knitting-cams. The oscillating rotary motion of the cam-cylinder B then commences and is attended by a proper movement of the rings D and E, each one tooth at a time, in opposite directions. These movements bring the cam-inclines $d'$ $e'$ to bear upon the uprights of the jack-shifters J' J, so that the end jack of the then operative group of needles is thrown inward, and this reduction of the number of operative needles is continued until the minimum has been reached. Thereupon, in a manner which will presently be described the actuating devices of the rings D and E reverse their motion, and consequently the cam-inclines $d'$ $e'$ throw a jack-shifter J or J' at the proper moment outward, so as to again bring its jack into the range of the knitting-cams. The necessary timing of these operations is so well understood by persons skilled in the art that no prolonged description of the sequence of movements is necessary, and we will therefore proceed to describe the actuating device of the rings D and E themselves. (Shown in detail in Figs. 16 to 20, inclusive.) A pair of pawls $m$ $m'$ engage in opposite directions with the ratchet-teeth D' E' upon the respective rings. These pawls are freely mounted upon vertical stems $m^{10}$ $m^9$, respectively, which stems are journaled in the top and bottom of a box $M^7$, so as to be capable of longitudinal movement. The range of this longitudinal movement is such that each pawl can be shifted from the horizontal plane of the lower ring E to that of the upper ring D. A spring $M^6$ tends to press the pawls into engagement with the ratchet-teeth whatever may be their vertical position. A longitudinal reciprocating movement is given to the box $M^7$ by means of an oscillating lever-arm T, (see Fig. 8,) mounted upon one end of a rock-shaft $t^2$, carrying a lever $t'$, having a cam-roller $t$, which fits within a cam-groove S', formed in one face of the disk $A^6$, which is mounted upon one end of the sliding clutch-sleeve $A^8$ in the driving system. During the period of continuous rotation of the driving-shaft and of said disk $A^6$ the position thereof is such that the cam-roller $t$ is not within the cam-groove S'; but during the period of reciprocation of the driving-shaft the engagement of the cam-roller $t$ with said cam-groove takes place. Hence, as before stated, the oscillating movement of the box $M^7$, and consequently the action of the pawls, coincides with the period of reciprocating movement of the cam-cylinder. Each one of the pawls $m$ $m'$ is of course only effective to force its ratchet in one direction, and hence it is necessary when the direction of movement of the rings D and E is to be changed to shift the pawls vertically, so that the one which before has been pawling the ring E shall now be brought into the plane of and pawl the ring D, and vice versa. This shifting of their planes is effected as follows: Upon the back of the box $M^7$ is a sliding plate M, having inclined grooves $m^7$ $m^8$, extending through it, and having upon its outer face two projecting pieces $M^4$ $M^5$ so arranged as to form an incline groove $m^4$ between them. The pawl-shifters $m^9$ $m^{10}$ have pins $m^6$ $m^3$, respectively, extending out through vertical slots in the back of the box $M^7$, and also projecting sufficiently far to extend into guide-slots $m^2$ $m^5$, respectively, formed in the guide-pieces M' $M^2$, which retain the sliding plate M in position upon the back of the box $M^7$. The slots $m^7$ $m^8$ are oppositely inclined, and hence a longitudinal shifting of the plate M will force the pins $m^6$ $m^3$ vertically in opposite directions, thus raising and lowering the pawl-shafts $m^9$ $m^{10}$, to which said pins are attached. This movement will therefore produce the necessary change of plane of the pawls $m$ $m'$, and it is effected at the proper time by means of a lever-arm P, (see Figs. 1 and 8 and dotted lines of Fig. 19,) which has upon its end a stud $p$, adapted to enter the inclined slot $m^4$ between the cam-pieces $M^4$ $M^5$ upon the back of the plate M. A vertical movement of the pin $p$ in said slot will of course throw the plate M horizontally in one direction or the other, and thus produce the necessary vertical shifting of the pawl-shafts.

The lever P is mounted upon one end of a rock-shaft upon whose other end is attached a finger P', which rests upon the chain O, which has alternately high and low portions $o'$ $o^2$, respectively, as indicated by dotted lines in Fig. 8. Normally the high portions are beneath the finger and the lever is in the position indicated in Fig. 19, so that the reciprocation of the box $M^7$ as a whole takes place without the pin $p$ becoming operative. When, however, the proper time arrives, a low portion $o^2$ of the chain O comes beneath the finger P', and thereupon a spring $P^2$ (see Fig. 8) forces the lever P upward, and the pin $p$ in its ascent shifts the plate M, as before described.

Since the ratchet-teeth upon the rings D and E are of such shape that the pawls in retreating will not slip out of them, it is necessary that each pawl should as it commences its retreating movement be positively cleared from the tooth with which it has been engaged. This is accomplished in the following manner: A longitudinal plate Q (see Fig. 17) slides endwise in guides formed upon the bottom of the box $M^7$. Said plate Q has formed in it slots $q$ $q'$, with opposite inclines, as indicated, and also elongated openings $Q^2$ $Q^6$, to permit the motion of the plate about the pawl-shafts $m^9$ $m^{10}$, which of course pass through it. Beneath the plate Q are two transverse strips $Q^3$ $Q^4$, carrying long pins $q^4$ $q^5$, respectively, which extend up into the interior of the box $M^7$ to the level of the highest plane in which the pawls operate. The strips $Q^3$ $Q^4$ are also provided with short studs $q^2$ $q^3$, respectively, which enter the slots $q$ $q'$ in the plate Q. A longitudinal movement of the plate Q relatively to the strips $Q^3$ $Q^4$ will shift the pins $q^2$ $q^3$ and strips $Q^3$ $Q^4$ transversely in opposite directions, and thus throw the pins $q^4$ $q^5$ toward or from the pawls $m$ $m'$, so as to either lift a pawl clear of the ratchet-teeth or permit it to enter them. The plate Q receives its longitudinal movement at the proper time in the following manner: Immediately under the slot $M^3$ in the base of the box $M^7$ the plate Q has a shorter slot $Q^5$, through which the lever-arm T extends. When said lever moves in either direction, the plate Q is shifted relatively to the box $M^7$ for a short distance before the longitudinal movement of the box as a whole commences, and therefore the throwing in and out of the pawls is made to precede the pawling and retreating movements thereof.

The movement of the chain O is effected in the following manner: Said chain runs upon a sprocket-wheel R and is then conducted over idlers R' $R^2$, so as to be out of the way. The sprocket-wheel R is provided with a ratchet $r$ on one side thereof, said ratchet being operated by a spring-pressed pawl $r'$, mounted upon one end of a vertical lever $r^2$, having a roller $r^3$, which receives a reciprocating movement from a rotating cam $A^7$, carried by the sleeve $A^8$. A spring $r^4$ co-operates with the cam to move the lever $r^2$.

The shifting motion of the coupling which changes the continuous rotation of the driving-shaft $A^3$ into the oscillating movement (when the widening and narrowing are to be effected) is accomplished, as before stated, by means of a pin $a^2$, mounted upon the end of a shifting-lever K. This shifting is intended to be done by hand; but to prevent the operator from making a movement in the wrong direction or at a wrong time we provide the following group of devices, (shown in Fig. 5 and partially upon an enlarged scale, Figs. 21 to 24, inclusive:) Said lever K swings in a horizontal plane on a pivot at the point L. Near the outer end of the lever-arm and on its under side is a stud $K^7$, (see dotted lines in Fig. 5,) which fits snugly in a cam-groove $K^6$ in cylinder $K^5$. (See the enlarged views of Fig. 21, &c.) The cylinder $K^5$ has upon one end a ratchet $K^9$ and spring-pawl $K^8$, which only permit it to turn in one direction. The cam-groove $K^6$ in the cylinder $K^5$ consists of a series of alternating inclines, and as the shifting movement of the lever and its stud $K^7$ is transverse to said groove it must of course rotate cam-cylinder $K^5$; but since the latter is only free to revolve in one direction, it is impossible to shift the lever K otherwise than as the series of inclines of the slot $K^6$ allows. Thus any movement of the shifting-lever in the wrong direction is prevented. To prevent its movement at the wrong time, the following device is applied: Upon the upper side of the lever K is a stud $K^{10}$, adapted to enter either one or two notches $K^2$ $K^3$, formed in the free end of a horizontal flap K', which is pivoted upon journals $K^4$ at its rear end. When said flap is down, the stud $K^{10}$ is held against any lateral movement by means of the notch $K^2$ or $K^3$, according to the then position of the lever-arm. A long finger $K^{11}$ projects laterally from the free end of the flap K' and enters an opening $V^2$ in the end of the bell-crank lever V', the other end of said bell-crank lever being provided with a lateral pin V, which is within the range of movement of laterally-projecting rollers $o^5$ upon the chain O. As said rollers in passing upward strike against the pin V they throw the vertical arm of the bell-crank V' backward, so as to raise the projecting arm $K^{11}$, and hence lift the flap K', disengaging the pin $K^{10}$ from the notches $K^2$ or $K^3$. Upon the one side of the lever K is a projecting piece $K^{14}$, having a collar $K^{13}$ at or near its middle, and on each side of said collar are springs $K^{47}$ $K^{12}$, respectively, having rigid supports $K^{15}$ $K^{16}$ so arranged as to bear in opposite directions against said collar and tend to maintain it equidistant between them. The point of equilibrium of the collar $K^{13}$ (and consequently of the piece $K^{14}$ and lever K) corresponds to a position of the stud $K^{10}$, which is between the notches $K^2$ and $K^3$, and said position of the stud $K^{10}$ corresponds with what we call the "neutral" position of the stud $K^7$ in the cam-groove $K^6$.

Referring to the diagrammatic view, Fig. 24, which represents the periphery of the cam-cylinder $K^5$ laid out upon a plane surface, the zigzag dotted line indicates the direction of the cam-groove. The several positions indicated by $k^3$ are neutral positions—that is to say, they are on a line extending around the middle longitudinally of the cylinder—and the extreme positions of the stud $K^7$ on either side of the neutral line are indicated by the points $k^2$ $k^4$ $k^6$ on one side and by the points $k^5$ $k^7$ on the other. The neutral line corresponds to a position of the shifting-lever K, in which the sleeve $A^8$ is equidistant from the gears $A^4$ and $A^5$, so that neither of said gears is coupled to the shaft $A^3$. It will thus be seen that the lever can only be shifted at predetermined intervals and that the normal tendency is to assume a neutral position corresponding with stoppage of the machine.

We claim, in a circular-knitting machine, the following combinations of parts, arranged with reference to the essential features of this class of machines, substantially in the manner herein set forth:

1. The combination, with the needle-cylinder having a slot $c$, which communicates with the bottoms of the needle-grooves, of the needles and the jacks pivoted to the same, said jacks having projections $f^2$ on their inner sides adapted to enter said slot.

2. The combination of the needles, the jacks pivoted thereto, the sliding jack-shifters engaging with the lower ends of said jacks, and mechanism, substantially as set forth, whereby said shifters are moved in a direction radial to the needle-cylinder.

3. The combination of the jack-shifters G, having uprights $g$, the cam-cylinder B, having a flange B' and communicating grooves $b$ $b'$ therein, adapted to receive said uprights, and switching mechanism, substantially as set forth, whereby said communication is controlled.

4. The combination, with the needles and the jacks hinged thereto, of three distinct groups of jack-shifters, one of said groups controlling the jacks throughout substantially a semicircle and each of the other groups controlling the jacks throughout nearly a quadrant at either end of said semicircle, and mechanism, substantially as set forth, whereby each group of jack-shifters is independently actuated.

5. The combination, with the needle-cylinder, cam-cylinder, needles, jacks, jack-shifters J and J', and their toothed actuating-rings D and E, arranged one above the other, of a pair of pawls facing in opposite directions and having shafts capable of vertical movement, a horizontally-movable carriage for said pawls, a pawl-shifter engaging with the respective pawls and adapted to shift them from the plane of one ring to that of the other, and mechanism, substantially as set forth, whereby said carriage is reciprocated and said pawl-shifters are actuated at stated intervals in the knitting operation.

6. The combination, with the cam-cylinder B and flange B', said flange having a pair of communicating grooves $b$ $b'$, of the pivoted switch-gate $g^3$, handle and stud $g^5$, the fixed piece N', having a groove $N^5$, with a funnel-shaped front end, and a pivoted slotted gate-piece $N^6$, arranged near the rear end of said groove, and mechanism, substantially as set forth, whereby said gate-piece is shifted at definite intervals in the rotation of the cam-cylinder.

7. The combination, with the toothed rings D and E, of the pawls $m$ $m'$, the longitudinally-movable shafts $m^9$ $m^{10}$, the pins $m^6$ $m^3$, mounted on said shafts, the horizontally-sliding box $M^7$, in which said shafts are journaled, the plate M, longitudinally movable with reference to said box and having slots $m^7$ $m^8$, inclined in opposite directions and adapted, respectively, to engage with the pins $m^6$ $m^3$, the cam-pieces $M^4$ and $M^5$, the lever P, having a stud $p$, adapted to engage between said cam-pieces, the piece Q, longitudinally movable with reference to said box and having slots $q$ $q'$ with opposite inclines, the strips $Q^3$ $Q^4$, having pins which engage in said slots and having pins $q^4$ $q^5$, adapted to engage with the pawls $m$ $m'$, respectively, and actuating mechanism, substantially as set forth, whereby said box as a whole is reciprocated and said plate Q is shifted relatively to said box, and also mechanism, substantially as set forth, whereby said lever P is actuated at definite intervals in the movement of said box.

8. The combination, with the driving-shaft $A^3$ and beveled gear $A^{10}$, rigidly mounted thereon, of the loose gears $A^4$ $A^5$, the sliding clutch-coupling whereby either of said gears may be coupled to said shaft, the gear $A^{12}$, engaging with the gear $A^5$, the segment $A^{11}$, engaging with the gear $A^4$, the radius-arm of said segment being provided with a slot $A^{13}$, the pin $A^{15}$, mounted upon the proximate face of the gear $A^{12}$ and engaging with said slot, and the main driving-shaft $A^4$, having a spur-gear adapted to rotate said gear $A^{12}$, whereby either a continuous rotary motion or an oscillating motion may be imparted to the shaft $A^3$ and its bevel-gear, substantially as set forth.

9. The combination, with the driving-shaft $A^3$ and the clutch-coupling which controls its movement, of the shifting-lever K, pin $K^7$, and the cylinder $K^5$, free to rotate in one direction only, and having a cam-slot $K^6$, adapted to engage with said pin, whereby a movement of the shifting-lever in the wrong direction is prevented.

10. The combination, with the driving-shaft $A^3$ and the clutch-coupling which controls its movement, of the shifting-lever K, having a stud $K^{10}$, hinged flap K', having notches adapted to engage with said stud, and mechanism, substantially as set forth, whereby said flap is raised at suitable intervals in the rotation of the driving-shaft, whereby shifting of the lever at the wrong time with reference to said rotation is prevented.

11. The combination, with the driving-shaft $A^3$ and the clutch-coupling which controls its movement, of the shifting-lever K, having a stud $K^{10}$, a hinged flap K', having notches adapted to engage with said stud, mechanism, substantially as set forth, whereby said flap is raised at intervals in the rotation of the driving-shaft, and a pair of springs normally tending to maintain said lever and said coupling in a neutral position with reference to the driving mechanism, substantially as set forth.

12. The combination, with the needle-cylinder, the cam-cylinder, the needles, and the jacks and jack-shifters connected with said needles and arranged in groups substantially in the manner set forth, of a bevel-gear engaging with said cam-cylinder, driving mechanism embracing a driving-gear and a driving-segment operatively connected with the main driving-shaft, a sliding clutch-coupling for determining the control of the said bevel-gear by the said driving-segment and driving-gear, a hand-lever engaging with said coupling, rotatable rings provided with cam-grooves adapted to engage with the respective jack-shifters of two groups thereof, an annular flange mounted upon the cam-cylinder and provided with cam-grooves adapted to engage with the jack-shifters of a third group, a gate-piece controlling the communication between said last-mentioned cam-grooves, actuating mechanism, substantially as set forth, for rotating said rings, respectively, and actuating mechanism, substantially as set forth, for shifting said gate-piece, a pattern-chain having high links $o'$ and low links $o^2$, studs $O^3$ $O^4$ upon its opposite sides and rollers $o^5$ upon one of its sides, a spring-actuated lever P, provided with a finger P', which rests upon said links, pawls engaging with said rings, actuating mechanism, substantially as described, for said pawls, operatively connected with and controlled by said lever P, a lever $N^3$, having projections $n$ $n^2$, adapted to engage, respectively, with said studs $O^3$ $O^4$ and operatively connected with the actuating mechanism of said gate-piece, a lever V', adapted to engage with the rollers $o^5$, a hinged flap K', engaging in one position with said hand-lever, which controls said coupling, but in its other position clearing said hand-lever, and means, substantially as set forth, whereby the lever V' is operatively connected with said hinged flap to control the times of movement of said hand-lever, substantially as set forth.

JULIA M. SLACK,
*Administratrix of James M. Slack, decd.*
GEO. J. GRAFF.
JOHN B. PAXTON.

Witnesses:
  WM. H. MYERS,
  JAMES H. BELL.